US012537880B2

(12) United States Patent
Qin et al.

(10) Patent No.: US 12,537,880 B2
(45) Date of Patent: Jan. 27, 2026

(54) BUSINESS DATA PROCESSING METHOD AND APPARATUS, DEVICE, STORAGE MEDIUM, AND PROGRAM PRODUCT

(71) Applicant: Tencent Technology (Shenzhen) Company Limited, Shenzhen (CN)

(72) Inventors: Liang Qin, Shenzhen (CN); Bin Li, Shenzhen (CN); Chuwei Zeng, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 106 days.

(21) Appl. No.: 18/374,477

(22) Filed: Sep. 28, 2023

(65) Prior Publication Data

US 2024/0031448 A1     Jan. 25, 2024

Related U.S. Application Data

(63) Continuation of application No. PCT/CN2023/079795, filed on Mar. 6, 2023.

(30) Foreign Application Priority Data

Mar. 28, 2022   (CN) .......................... 202210314019.8

(51) Int. Cl.
*H04L 9/40*      (2022.01)
*H04L 67/51*     (2022.01)
*H04L 67/60*     (2022.01)

(52) U.S. Cl.
CPC .......... *H04L 67/51* (2022.05); *H04L 63/0428* (2013.01); *H04L 67/60* (2022.05)

(58) Field of Classification Search
CPC ...... H04L 67/51; H04L 67/60; H04L 63/0428
(Continued)

(56) References Cited

U.S. PATENT DOCUMENTS 10,972,444 B1 *  4/2021  Schiesser ................ H04L 63/10
11,606,359 B1 *  3/2023  Virtser ................... H04L 63/123
(Continued)

FOREIGN PATENT DOCUMENTS

| CN | 105227315 A |   | 1/2016 |           |
|----|-------------|---|--------|-----------|
| CN | 109617926 A |   | 4/2019 |           |
| CN | 112307444 A | * | 2/2021 | G06F 21/30 |

OTHER PUBLICATIONS

Tencent Technology, ISR, PCT/CN2023/079795, May 22, 2023, 2 pgs.
Tencent Technology, Written Opinion, PCT/CN2023/079795, May 22, 2023, 3 pgs.

*Primary Examiner* — Moustafa M Meky
*Assistant Examiner* — Kidest Mendaye
(74) *Attorney, Agent, or Firm* — Morgan, Lewis & Bockius LLP

(57) ABSTRACT

This application discloses a business data processing method performed by an electronic device. The method includes: acquiring an application login request of a first object for a target application system, the application login request comprising a first account of the first object associated with a first account system; generating, according to the first account, a login credential of a terminal corresponding to the first object; triggering the terminal to log in the target application system based on the login credential; in response to receiving a call request of the terminal for a target component in the target application system, performing data filtering on component data corresponding to the target component according to the login credential to obtain target component data; and transmitting the target component data to the terminal, the target component data being used for the terminal to perform business processing based on the target component data.

20 Claims, 6 Drawing Sheets

(58) Field of Classification Search
USPC .......................................................... 709/223
See application file for complete search history.

(56) References Cited

U.S. PATENT DOCUMENTS

| | | | |
|---|---|---|---|
| 2015/0142941 A1* | 5/2015 | Barwicki | H04L 47/80 |
| | | | 709/223 |
| 2017/0310759 A1 | 10/2017 | Sridharan et al. | |
| 2019/0384794 A1* | 12/2019 | Holly, Jr. | G06F 16/951 |
| 2020/0112555 A1* | 4/2020 | Brown | H04L 63/083 |

* cited by examiner

BUSINESS DATA PROCESSING METHOD AND APPARATUS, DEVICE, STORAGE MEDIUM, AND PROGRAM PRODUCT

CROSS-REFERENCE TO RELATED APPLICATIONS

This application is a continuation application of PCT Patent Application No. PCT/CN2023/079795, entitled "BUSINESS DATA PROCESSING METHOD AND APPARATUS, DEVICE, STORAGE MEDIUM, AND PROGRAM PRODUCT" filed on Mar. 6, 2023, which is based on and claims priority to Chinese Patent Application No. 202210314019.8, entitled "BUSINESS DATA PROCESSING METHOD AND APPARATUS, DEVICE, STORAGE MEDIUM, AND PROGRAM PRODUCT" filed on Mar. 28, 2022, all of which is incorporated herein by reference in its entirety.

FIELD OF THE TECHNOLOGY

This application relates to the technical field of computers, and in particular to, a business data processing method and apparatus, a device, a storage medium, and a program product.

BACKGROUND OF THE DISCLOSURE

In to business (ToB), it is common to work with an external team to promote the development of an application system, and the external cooperation team often needs to obtain the internal data of the application system to complete the business requirements during the business processing.

In the related art, an application system interface without authentication and verification is directly provided to the external cooperation team to pull data for development. However, some internal data in the application system is very sensitive. This processing method will directly expose the internal data of the system. External personnel can also call any data of the application system at will, which easily leads to data leakage.

SUMMARY

The embodiments of this application provide a business data processing method and apparatus, an electronic device, a computer-readable storage medium, and a computer program product, which can perform a business processing function on the premise of ensuring data security in a target application system, reducing the risk of data leakage.

The embodiments of this application provide a business data processing method performed by an electronic device, the method including:

acquiring an application login request of a first object for a target application system, the application login request comprising a first account of the first object associated with a first account system of the target application system;

generating. according to the first account, a login credential of a terminal corresponding to the first object;

triggering the terminal to log into the target application system based on the login credential;

in response to receiving a call request of the terminal for a target component in the target application system, performing data filtering on component data corresponding to the target component according to the login credential to obtain target component data; and transmitting the target component data to the terminal, the target component data being used for the terminal to perform business processing based on the target component data.

The embodiments of this application provide an electronic device including a processor and a memory, the memory storing computer-executable instructions, and the processor loading the computer-executable instructions to execute the business data processing method provided by the embodiments of this application.

The embodiments of this application also provide a non-transitory computer-readable storage medium storing thereon computer programs, the computer programs, when executed by a processor of an electronic device, causing the electronic device to perform the business data processing method provided by the embodiments of this application.

The embodiments of this application have the following beneficial effects:

Applying the embodiments of this application, the target application system includes at least two account systems, and as such, accounts in different account systems can be prevented from being mixed, to ensure the security of business data in each account system. For a first account in a first account system in a target application system, a login credential corresponding to the account and used for logging in the target application system is independently generated; and when a call request of a first object for a target component in the target application system is received, data filtering is performed on component data corresponding to the target component according to the login credential. In this way, the limitation of the data access range of the first object is realized through data filtering, the function of performing business processing on the premise of ensuring data security in the target application system is realized, and the risk of data leakage is reduced.

DESCRIPTION OF EMBODIMENTS

The technical solutions in the embodiments of this application will be clearly and completely described below in conjunction with the drawings in the embodiments of this application. Obviously, the described embodiments are only a part of the embodiments of this application, and not all of them. All other embodiments obtained by a person skilled in the art based on the embodiments of this application without creative efforts shall fall within the protection scope of this application.

The embodiments of this application provide a business data processing method and apparatus, an electronic device, a computer-readable storage medium, and a computer program product; the business data processing apparatus can be integrated into the electronic device, and the electronic device may be a terminal, or a server, and the like.

It is to be understood that the business data processing method of the embodiment may be executed on a terminal, may be performed on a server, or may be executed jointly by the terminal and the server. The above examples are not to be construed as limiting this application.

Figure 1A:
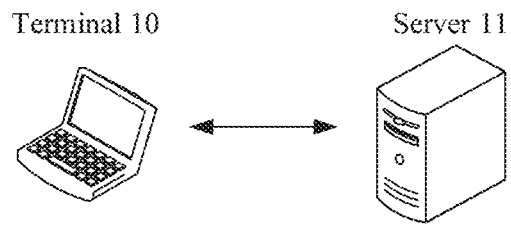
FIG. 1A is a scene diagram of a business data processing method provided by an embodiment of this application.

As shown in FIG. 1A, an example is given in which a terminal and a server jointly execute the business data processing method. The business data processing system provided by the embodiment of this application includes a terminal 10, a server 11, and the like. The terminal 10 and the server 11 are connected via a network, for example, via a wired or wireless network; the business data processing apparatus may be integrated in the server.

The terminal 10 can be configured to send an application login request for a target application system to the server 11, the application login request including a first account of the first object, the target application system including at least two account systems, and the first account being an account in a first account system.

The server 11 is configured to acquire an application login request of a first object for a target application system and generate a login credential of a terminal 10 corresponding to the first object for logging in the target application system according to a first account.

The terminal 10 is further configured to receive a login credential sent by the server 11, log in the target application system based on the login credential, and send a call request for a target component in a target application system to the server 11.

The server 11 is further configured to perform, in response to receiving a call request of the terminal 10 for a target component in the target application system, data filtering on component data corresponding to the target component according to the login credential to obtain target component data; and send target component data to the terminal 10.

The terminal 10 is further configured to perform business processing based on the target component data.

The server 11 may be an independent physical server, may also be a server cluster or distributed system composed of a plurality of physical servers, and may also be a cloud server providing basic cloud computing services such as a cloud service, a cloud database, cloud computing, a cloud function, cloud storage, a network service, cloud communication, a middleware service, a domain name service, a security service, a content delivery network (CDN), and a large data and artificial intelligence (AI) platform. The terminal 10 may be but is not limited to, a smartphone, a tablet, a laptop, a desktop computer, a smart speaker, and a smartwatch. For the business data processing method or apparatus disclosed in this application, a plurality of servers can be grouped into a blockchain, and the servers are nodes on the blockchain.

A client may also be provided on the terminal 10, which may be an application program client, a browser client, or the like.

Each is described in detail below. The order of description of the following embodiments is not intended to limit the preferred order of the embodiments.

The embodiments will be described from the point of view of a business data processing apparatus; the business data processing apparatus may be integrated in an electronic device, which may be a server, a terminal, or the like.

It is to be understood that in the implementations of this application, relating to relevant data of user information and the like, user permission or consent needs to be obtained when the embodiments of this application are applied to products or technologies; and collection, use, and processing of the relevant data needs to comply with relevant laws and regulations and standards of relevant countries and regions.

The business data processing method of the embodiment of this application can be applied to the scene where various external teams collaborate to develop an application system. The embodiment can be applied to various scenes such as cloud technology, artificial intelligence, intelligent transportation, assisted driving, and the like.

Figure 1B:
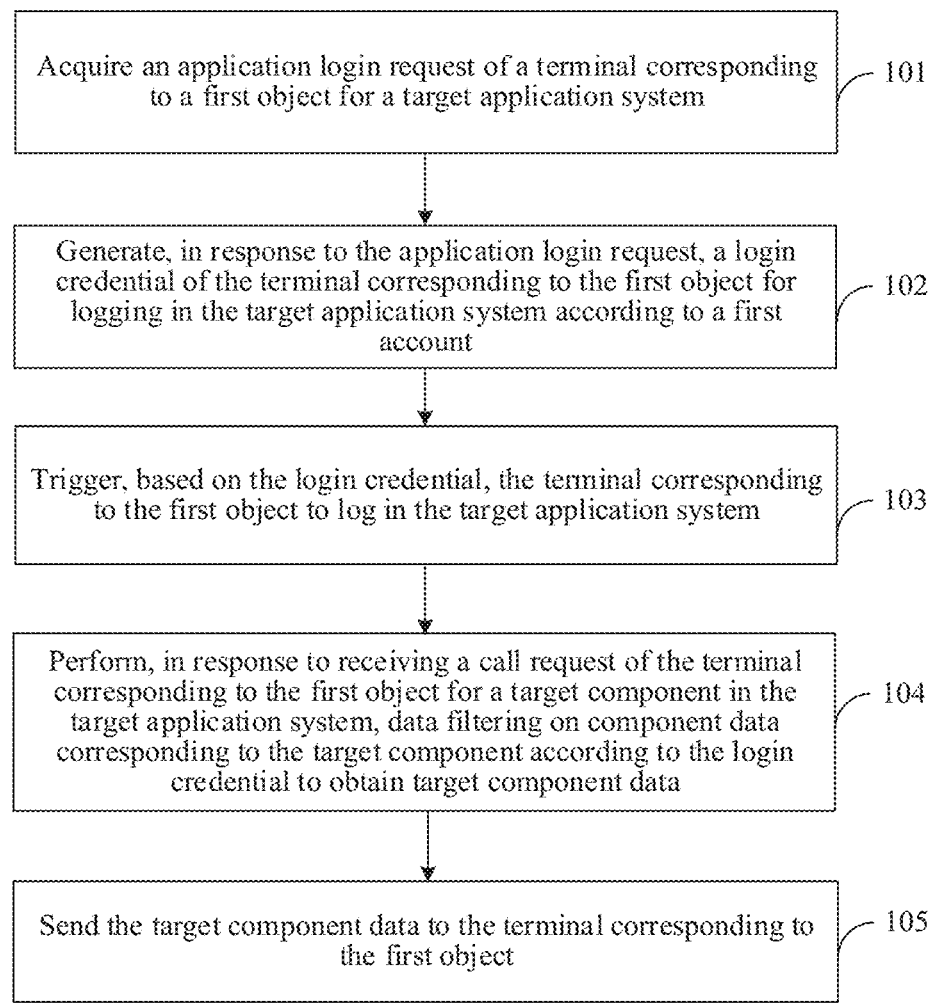
FIG. 1B is one flowchart of a business data processing method provided by an embodiment of this application.

In some embodiments, the business data processing method can be implemented by a server or a terminal alone, or by a server and a terminal in cooperation; taking server implementation as an example, as shown in FIG. 1B, the flow of the business data processing method includes:

101: Acquire an application login request of a terminal corresponding to a first object for a target application system.

In practical applications, the application login request may include a first account of a first object, and the target application system includes at least two account systems; at least two account systems include a first account system; and the first account is an account in the first account system.

In the embodiment, the user of the target application system can be divided into an internal user (that is, internal personnel) and an external user (that is, external personnel), and the external user can be a person with limited access to the system. In practical scenes, such as ToB, it is common to work with an external team to promote the development of an application system, and the external cooperation team often needs to obtain the internal data of the application system to complete the business requirements during business processing. However, some internal data in the application system is very sensitive data, such as address book data. In order to ensure data security and at the same time provide an external development team with the capability of acquiring the application system data, this application provides a technical solution that an external development team can safely obtain address book data of a target application system.

For example, the target application system is a system developed by enterprise a; and since business requirements, enterprise b and enterprise a need to use data in the target application system in cooperation, enterprise a needs to authorize enterprise b to use the target application system, and a user corresponding to the authorized enterprise b can be considered as external personnel of the target application system, and a user corresponding to enterprise a is considered as internal personnel of the target application system.

The first object may be an external user of the target application system, or referred to as a third-party user. The external user may be a person with limited system usage right; and the third party may refer to an external cooperative team other than the internal development team of the target application system, namely, a development team that can only make secondary development through the interface exposed by the target application system. The first account may be regarded as object identification information about the first object, and in a practical scene, the first account may include an enterprise identification (ID) and a user ID of the first object; the enterprise ID is used for identifying an enterprise where the first object is located, and the user ID is used for identifying an individual identity of the first object.

The first account system may be an account system used by external personnel, and the second account system may be an account system used by internal personnel of the target application system. The data presented by the target application system may be different under different account systems.

The target application system may be a message interaction system, and the type of the system is not limited; for example, the target application system may be an instant messaging system, and this is not limited in the embodiment.

In an embodiment, a two-dimensional code image for logging in a target application system can be acquired, and a first object can send an application login request containing a first account to a server (which can be an application system background) through scanning the two-dimensional code image so that the server authorizes the first account to log in the target application system based on the application login request.

102: Generate, in response to the application login request, a login credential of a terminal corresponding to the first object for logging in the target application system according to a first account.

In some embodiments, a login credential of a terminal corresponding to the first object for logging in the target application system according to a first account may be generated as follows:

encrypting the first account to obtain encrypted data; and determining, based on the encrypted data, a login credential of the terminal corresponding to the first object for logging in the target application system.

The manner of encryption processing may be various, for example, the encryption processing may be symmetric encryption or asymmetric encryption, and the embodiment is not limited thereto. The encryption key and the decryption key for symmetric encryption are the same, while the encryption key and the decryption key for asymmetric encryption are different. Asymmetric encryption algorithms require two keys, that is, a public key and a private key. The public key and the private key are a pair, and if the data is encrypted with a public key, it can only be decrypted with the corresponding private key; if the data is encrypted with a private key, it can only be decrypted with the corresponding public key.

Encrypting the first account may include performing a hash operation on the first account to obtain a hash value of the first account; encryption processing is performed on the hash value of the first account based on the key to obtain encrypted data; and the encrypted data is determined as a login credential of the terminal corresponding to the first object for logging in the target application system.

In the embodiment, through encryption processing, the first account of the first object can be encrypted and stored in the login credential. In practical applications, if the first account contains the enterprise ID and user ID of the first object, the enterprise ID and user ID of the first object are encrypted and stored in the login credential. The login credential may be viewed as a ticket for the first account of the first object to use the target application system.

In practical applications, after receiving an application login request sent by a terminal corresponding to a first object, an application system background can parse the application login request to obtain a first account contained therein, then generate a login credential according to the first account, and dispatch the login credential to the terminal where the first object is located.

103: Trigger, based on the login credential, the terminal corresponding to the first object to log in the target application system.

In practical applications, after a login credential is generated, the login credential may be sent to a terminal corresponding to a first object; and after the terminal corresponding to the first object receives the login credential, the terminal corresponding to the first object may log in a target application system according to the login credential.

104: Perform, in response to receiving a call request of the terminal corresponding to the first object for a target component in the target application system, data filtering on component data corresponding to the target component according to the login credential to obtain target component data.

After the terminal corresponding to the first object logs in the target application system, the terminal corresponding to the first object may expose an application page corresponding to the target application system, and the application page may include at least one component; the component may be a software component in a network application, also referred to as a middleware. The component may provide some standard and simple application interface, allowing parameters and attributes to be set and adjusted.

In practical applications, the first object may send a call request for the target component to the application system background through a triggering operation, such as a click operation or a slide operation, on the target component in the application page to acquire component data related to the target component based on the call request. The target component may be any component in the application page. The component data may be relevant business information of a business function corresponding to the component.

The components in the embodiment may be iframe controls embedded in an application page. Iframe is a hypertext markup language (HTML) tag that can be used to create an inline framework containing another document, that is, to create a document in the document. When the first object accesses the application page embedded with the iframe control, if the iframe control is triggered, the service permission of the first account can be authenticated through the application system background to obtain data that can be accessed by the first object under the account permission of the first account, and then these data are transmitted to the terminal corresponding to the first object.

In the embodiment, based on the provided iframe control, a third party (namely, a first object) cannot directly call the component data. Through the displayed iframe control in the target application system, the iframe control can provide relevant functional interaction; the iframe control is a black box for the third party and can isolate the component data from the third party, to better ensure the security of data and prevent data leakage.

In an embodiment, sending a call request for a target component to a server (which may be an application system background) may be triggered in a terminal where a first object is located in response to a triggering operation of the first object on the target component in the target application system, such as a click operation or a slide operation. In addition, a third party (namely, a first object) calling component data also needs to carry a login credential, and the application system background will verify the login credential, and only when the verification is successful, component data is returned to a terminal corresponding to the first object.

In some embodiments, the call request includes a login credential. When a server receives a call request of a terminal corresponding to a first object for a target component in a target application system, according to a login credential, data filtering can be performed on component data corresponding to the target component in the following manner:

parsing, in response to receiving the call request of the terminal corresponding to the first object for the target component in the target application system, the login credential in the call request to obtain the first account of the first object; and performing, according to account permission corresponding to the first account, data filtering on the component data corresponding to the target component.

The call request may carry a login credential, and the login credential is parsed, namely, decryption processing is performed on the login credential; and the algorithm used in the decryption processing corresponds to the algorithm used in the encryption processing in step 102. Through decryption processing, the object identification information about the first object, namely, the first account, can be acquired, to determine the identity information about the first object; and then according to the identity information, the data range of the target application system which can be accessed by the first object is determined.

The data content of the target application system which cannot be viewed by the first object corresponding to the first account can be determined according to the account permission of the first account, and then the data filtering is performed on the component data corresponding to the target component based on the data content to obtain the target component data. Data filtering is also referred to as data screening. The filtered component data obtained by data filtering is the data content that can be accessed by the first object under the account permission of the first account. Thus, the limitation of the data access range of the first object is realized through data filtering, the function of performing business processing on the premise of ensuring the data security in the target application system is realized, and the risk of data leakage is reduced.

The embodiment can provide the application system background with identity authentication through the login credential distributed to the terminal corresponding to the first object, and limit the data range accessed by the call request of the target application system. When a terminal corresponding to a first object has a correct login credential and calls a target component in a target application system, the login credential may be decrypted via the application system background based on a call request; a first account of the first object is acquired (which may include an enterprise ID and a user ID of the first object); and component data of the first object within a visible range of the enterprise is returned to the terminal corresponding to the first object via the trusted enterprise ID and the user ID.

In some embodiments, when receiving a call request of a terminal corresponding to a first object for a target component in a target application system, according to a login credential, data filtering can be performed on component data corresponding to the target component in the following manner:

performing validity verification on the login credential in response to receiving the call request of the first object for the target component in the target application system; and performing, when the login credential passes the validity verification, data filtering on the component data corresponding to the target component.

In practical applications, a login credential distributed by an application system background to a terminal corresponding to a first object may have a certain validity time, and the validity time thereof may be set according to actual situations, for example, may be set as 24 hours.

In some embodiments, the validity verification on the login credential may include a time validity verification and an identity validity verification. After the login credential pass the time validity verification and the identity validity verification, the component data corresponding to the target component is filtered. In practical applications, when an application system background receives a call request sent by a terminal corresponding to a first object, identity validity verification can be performed on a login credential in the call request, and the login credential can be decrypted to obtain a first account of the first object; and if the first account is an account authorized to be able to log in a target application system, the identity validity verification is passed. According to the distribution time of the login credential, the time validity verification is performed on the login credential, for example, if the valid time is 24 hours, it can be determined whether the distribution time exceeds 24 hours from the current time, and if not, the time validity verification is passed.

In the embodiment, the terminal corresponding to the first object may be triggered to log in the target application system by sending a login credential to the terminal corresponding to the first object. When a first object calls a component in a target application system, if there is no login credential, a code scanning page will be reset; the first object sends an application login request containing a first account to the application system background via the code scanning, to trigger the application system background to dispatch a login credential to a business party (namely, a terminal corresponding to the first object), and after receiving the login credential, the business party can cache the login credential, preventing each calling component from needing another code scanning to log in the target application system. In practical applications, a login credential has a valid time, and when the valid time is reached, the login credential will be invalid; the calling component will fail, and another code scanning is needed to acquire a new login credential.

In some embodiments, the call request includes a search request, and when receiving a call request of a terminal corresponding to a first object for a target component in a target application system, according to a login credential, data filtering can be performed on component data corresponding to the target component to obtain the target component data in the following manner:

performing, in response to receiving the search request of the terminal corresponding to the first object for the target component in the target application system, data search on the target component to obtain searched component data; and performing, according to the login credential, data filtering on the searched component data.

The business data processing method provided in this application can support a search function, and in practical applications, content needed to be searched can be selected on an application page corresponding to a target application system, and then a search control is triggered, namely, data search can be performed on the content.

Figure 1C:
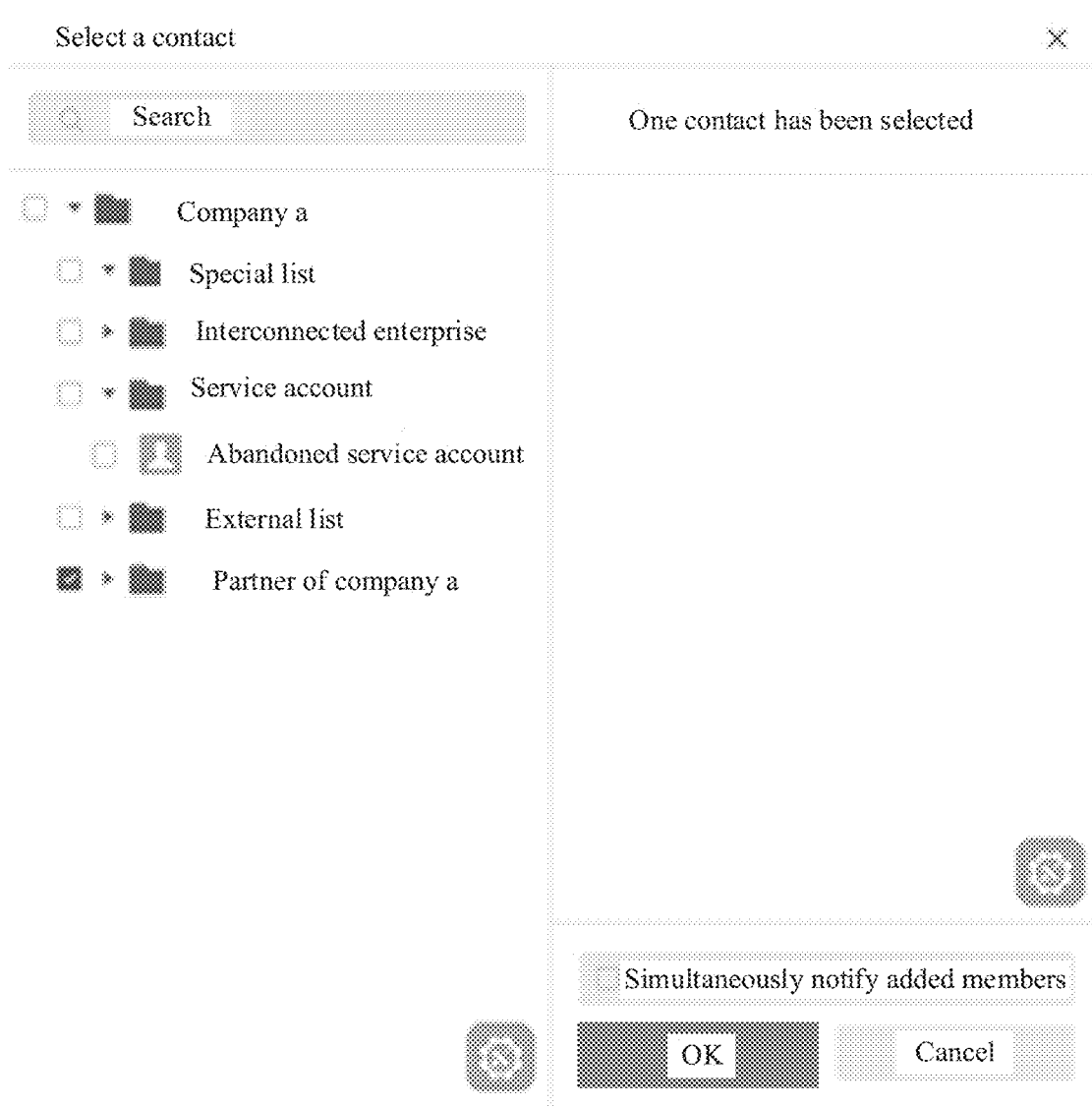
FIG. 1C is a page diagram of a business data processing method provided by an embodiment of this application.

This application can complete a business requirement for the display of component data required by a third-party team through the iframe control embedded in an application page of a target application system. The component data can be address book data (namely, organization architecture data), and also provide basic interactive functions, such as the selection and search of an organization architecture or an organization member, as shown in FIG. 1C. FIG. 1C shows the organization architecture data corresponding to "company a", which includes the organization architectures of "special list". "interconnected enterprise", "service account", "external list", and "partner of the company a"; and under the organization architecture of "service account", the organization members of "abandoned service account" are also included. The first object may obtain corresponding component data through a call request for a component corresponding to the organization architecture data on the page.

Figure 1D:
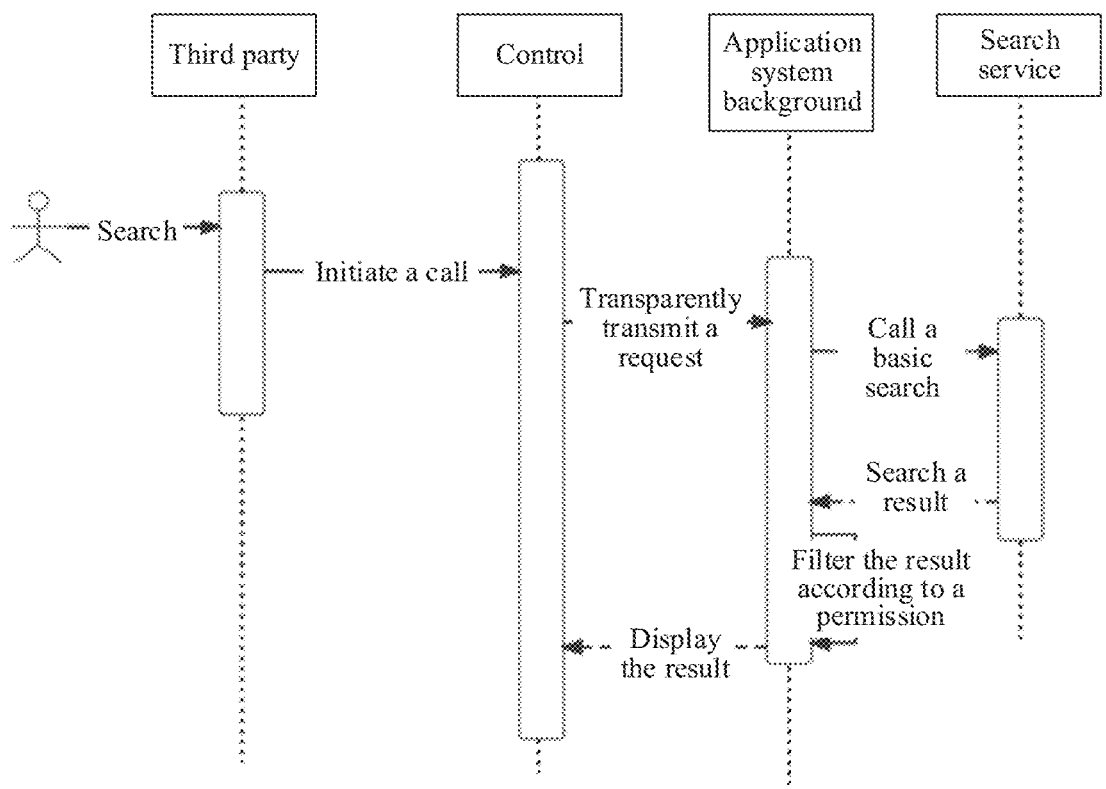
FIG. 1D is another flowchart of a business data processing method provided by an embodiment of this application.

In one embodiment, as shown in FIG. 1D, when a first object (namely, a third party) searches for a target component in a target application system, namely, when a search call is initiated on the target component (which may be the iframe control), a search request thereof may be transparently transmitted via the target component; after receiving the search request, the application system background may call a search service for a basic search; and after the search service returns a search result to the application system background, the application system background may perform data filtering on the search result according to account permission of a first account corresponding to the first object to obtain filtered component data; and the filtered component data is sent to a terminal corresponding to a first object for display.

105: Send the target component data to the terminal corresponding to the first object.

In practical applications, after a server sends target component data to a terminal corresponding to a first object, the terminal performs business processing based on the target component data.

In some embodiments, the above at least two account systems further include a second account system; the second account system is an account system where a target organization architecture in a target application system is located, and the target organization architecture includes at least one organization member. The components of the target application system include components corresponding to the organization architecture data.

The target organization architecture may be an organization architecture in the target application system, for example, a department in an enterprise may be regarded as an organization architecture, or the whole enterprise may also be regarded as an organization architecture, and the embodiment is not strictly limited thereto.

The organization architecture refers to the overall structure of an organization, which is the most basic structural basis for the operation of the organization's process, department setting, and functional planning. The organization architecture data may include information such as organizations at various levels in the enterprise or organization and personnel belonging to various organizations. Therefore, organization architecture data is sensitive, and the security of data needs to be improved.

In practice, the target organization architecture may include at least one organization architecture (also referred to as an organization unit); each organization architecture includes at least one organization member, and the organization members need to be arranged according to the organization architecture in the target application system. For example, if the target organization architecture is an enterprise, the organization units may be departments in the enterprise, and the organization members in the organization units may be employees in the corresponding departments.

In some embodiments, the organization members in the organization architecture may have account information under the target application system. The account information may include an account of a corresponding organization member in a target application system, a mailbox, and the like.

It should be noted that component data may include organization architecture data, that is, address book data. The organization architecture data may include the organization architecture itself, as well as the corresponding organization members. The address book refers to the tree structure of enterprise organization architecture and personnel structure in the target application system.

In some embodiments, the target component data (that is, filtered component data) includes target organization architecture data. Accordingly, the server can also perform the following processing:

acquiring original organization identification information about the target organization architecture data under the second account system; transforming the original organization identification information to obtain target organization identification information about the target organization architecture data under the first account system; and sending target organization identification information to a terminal corresponding to the first object.

The original organization identification information may be the organization identification information about the target organization architecture data under the second account system. The target organization architecture data may include the organization architecture itself as well as the organization members. The organization identification information may be an ID of the organization architecture data, or information having identification such as an account and a mailbox. If the target organization architecture data is an enterprise, the organization identification information thereof is an enterprise ID; if the target organization architecture data is an enterprise member, the organization identification information thereof may be a member ID. The enterprise ID is a number used for uniquely identifying a certain enterprise in a target application system, and the member ID is a number used for uniquely identifying an enterprise member in the target application system.

The embodiment can convert the original organization identification information about the target organization architecture data in the second account system into the target organization identification information in the first account system to send the same to the terminal corresponding to the first object, enabling the terminal corresponding to the first object to display the transformed target organization identification information about the target organization architecture data without displaying the original organization identification information thereof; and hiding the original organization identification information is beneficial to improving the security of the organization architecture data. The target organization identification information aims at a first account system to which a first account of a first object belongs, and the original organization identification information is organization identification information under a native account system inside a target application system.

In some embodiments, the original organization identification information may be transformed to obtain the target organization identification information about the target organization architecture data under the first account system in the following manner:

encoding, based on the first account of the first object, the original organization identification information to obtain encoded organization identification information; and determining the target organization identification information about the target organization architecture data under the first account system based on the encoded organization identification information.

In practical applications, the first account of the first object can also be encoded into the original organization identification information, the obtained target organization identification information is for the first object, and the first account system can also be considered as an account system corresponding to the first object. Based on the object identification information about the joined first object, different third-party development teams (namely, external teams) can be enabled to apply different account systems.

There are various ways to encode the original organization identification information based on the first account of the first object, and the embodiment is not limited thereto. For example, the encoding method may be a fusion method such as addition. After the encoding processing, the encoded organization identification information can be determined as the target organization identification information about the target organization architecture data under the first account system.

The target organization identification information can be recorded as an OpenID, and the OpenID can be regarded as an account of the target organization architecture data under an external (namely, to the first object) account system, which is different from an account of the target application system under an original internal account system. The target organization identification information may be a member ID and an enterprise ID obtained after encrypting and encoding the original organization identification information.

For example, in a scene, target organization architecture data may include an organization architecture (an enterprise) and an organization member (an enterprise member). Object identification information (namely, a first account) about a first object is recorded as an AppID. Original organization identification information about the target organization architecture data in a target application system may be recorded as an enterprise ID and a member ID. An encoding process corresponding to the target organization identification information may be represented by the following formula:

External enterprise ID=encoding (AppID, enterprise ID)

External member ID=encoding (AppID, member ID)

The external enterprise ID represents the target organization identification information about the organization architecture (enterprise) under the first account system, and the external member ID represents the target organization identification information about the organization member (enterprise member) under the first account system.

By encoding the AppID into the target organization identification information, different third-party teams can access the target application system with different account systems to avoid risks caused by mixing.

In the embodiment, for a third-party development team, original organization identification information about the organization architecture data can be encoded to avoid exposing the native account system inside the target application system. At the same time, for different third-party development teams, different account systems can be used. This application may address the need for external account system differentiation based on the AppID of authorized third-party development teams.

In some embodiments, after sending the target organization identification information to the terminal corresponding to the first object, the server may also trigger the terminal corresponding to the first object to display an address book page corresponding to the target organization architecture data; the address book page includes the target organization identification information about the target organization architecture data under the first account system.

The business data processing method provided in this application can ensure the security of a third-party team accessing internal data of a target application system in the process of collaborative development of the target application system, and prevent sensitive information, such as address book data, from being disclosed. At the same time, for different access teams, different account systems can be used to prevent different access teams from sharing an account system, and the original account system inside the target application system is shielded externally, thus reducing the risk of being attacked.

Figure 1E:
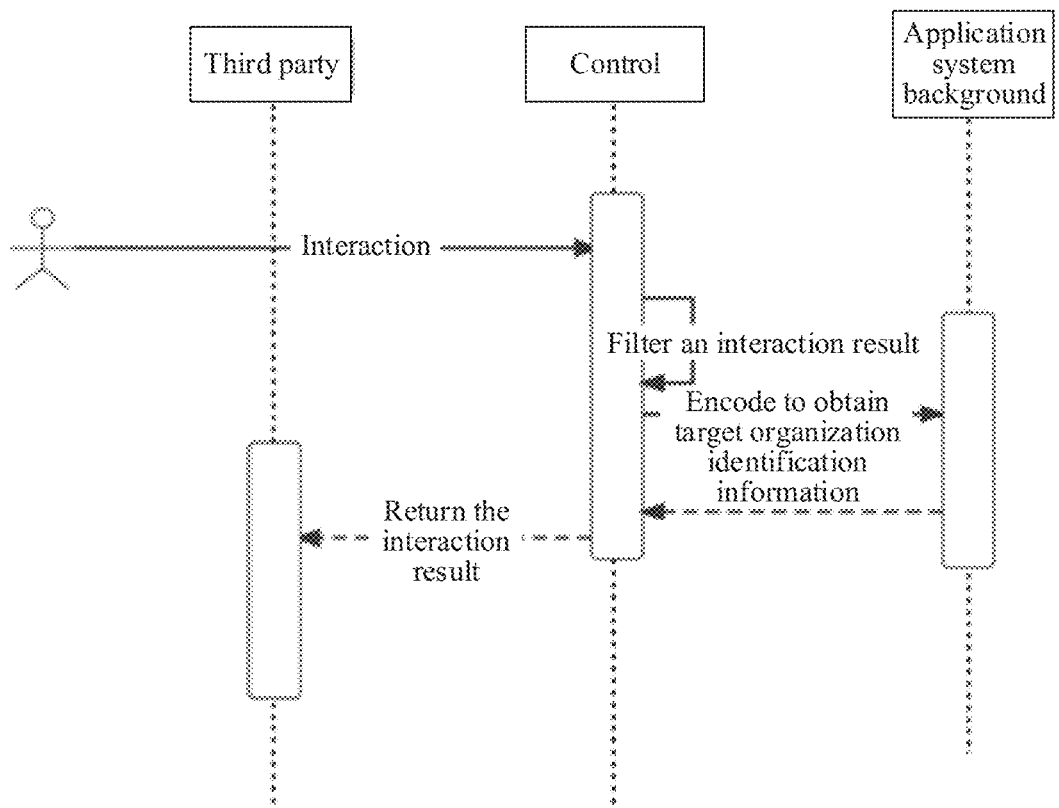
FIG. 1E is another flowchart of a business data processing method provided by an embodiment of this application.

In one embodiment, as shown in FIG. 1E, when a first object (a third party) performs an interactive operation on a target component in a target application system, namely, initiating a call request on the target component (which can be an iframe control), the call request thereof can be transparently transmitted via the target component; and component data of the target component is filtered based on the call request to obtain filtered component data (an interaction result). If the filtered component data contains target organization architecture data, since the organization architecture data is important information, the original organization identification information about the target organization architecture data in the target application system may be encoded to obtain the target organization identification information about the target organization architecture data in the first account system; and the encoded target organization identification information is returned as a final interaction result to the terminal corresponding to the first object.

Figure 1F:
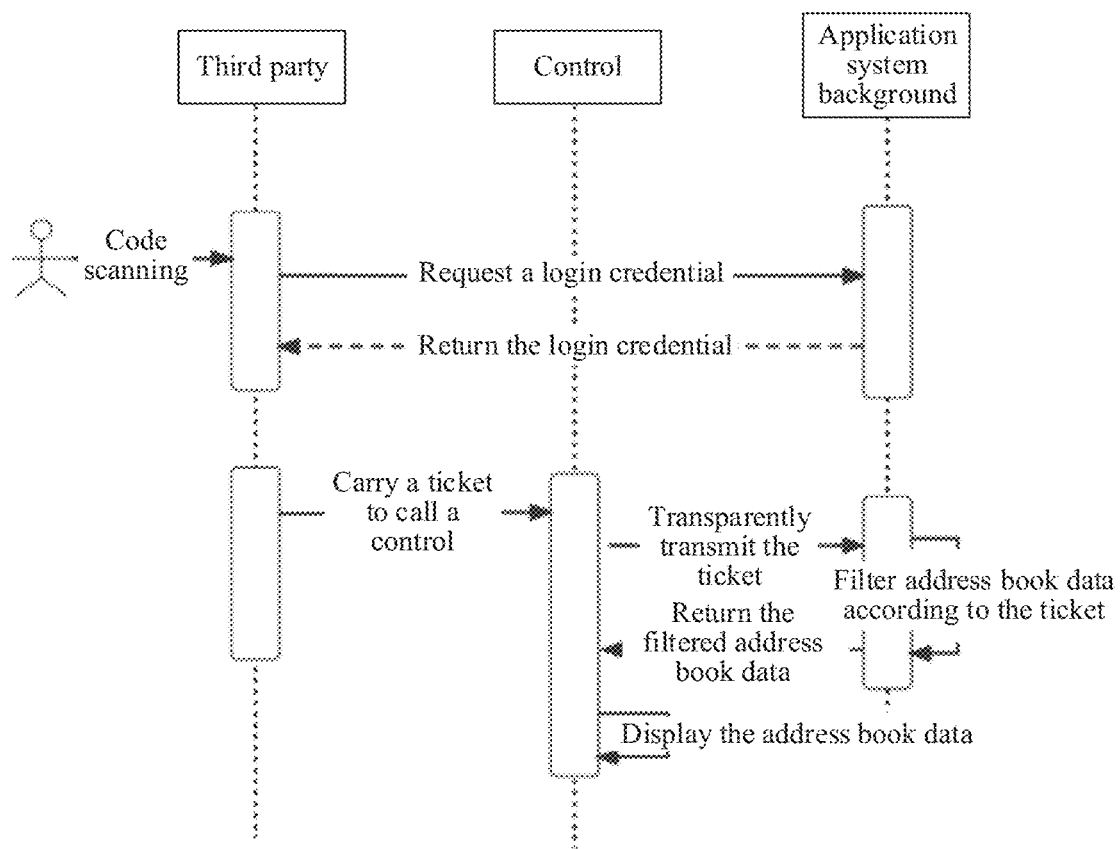
FIG. 1F is another flowchart of a business data processing method provided by an embodiment of this application.

In a practical application, as shown in FIG. 1F, the flow of a first object calling component data of a target component in a target application system is illustrated. It will be appreciated that the first object (third party) needs authorization to obtain data content (for example, address book data) within the target application system, and the first object needs login credentials to properly initiate control calling. The first object may send an application login request to an application system background by scanning a two-dimensional code used for the login of a target application system. The application system background may generate a login credential based on a first account contained in the application login request; the login credential may be obtained by performing symmetric encryption processing on the first account so that a third party cannot crack and modify information therein; and then the login credential is dispatched to a terminal corresponding to the first object. When a first object calls a target component in a target application system, the login credential needs to be transmitted as a ticket, that is to say, the first object needs to send a call request carrying the login credential and aiming at the target component of the target application system to the application system background, when the first object initiates the call request, the call request containing the ticket can be transparently transmitted via the target component; and after receiving the call request, the application system background can determine an account permission of the first object corresponding to a first account according to the ticket to control an address book data range which can be accessed by the first object; based on the account permission, the address book data is filtered; and the filtered address book data is returned to a terminal corresponding to the first object for display.

Applying the embodiments of this application, the target application system includes at least two account systems, and as such, accounts in different account systems can be prevented from being mixed, to ensure the security of business data in each account system. For a first account in a first account system in a target application system, a login credential corresponding to the account and used for logging in the target application system is independently generated; and when a call request of a first object for a target component in the target application system is received, data filtering is performed on component data corresponding to the target component according to the login credential. Therefore, the limitation of the data access range of the first object is realized through data filtering, the function of performing business processing on the premise of ensuring data security in the target application system is realized, and the risk of data leakage is reduced.

Figure 2:
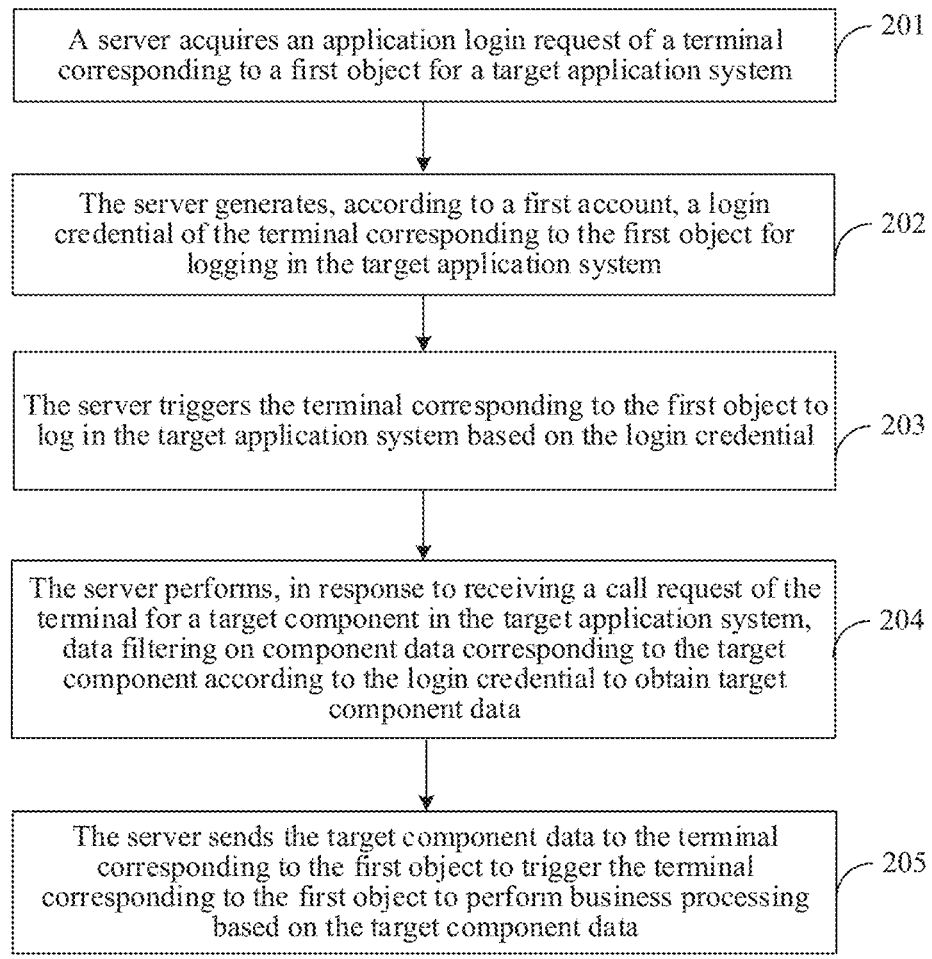
FIG. 2 is another flowchart of a business data processing method provided by an embodiment of this application.

According to the method described in the previous embodiments, the integration of the business data processing apparatus in a server will be described in detail below as an example. The embodiments of this application provide a business data processing method, and as shown in FIG. 2, the flow of the business data processing method can be as follows:

201: A server acquires an application login request of a terminal corresponding to a first object for a target application system.

In practical applications, the application login request may include a first account of a first object, and the target application system includes at least two account systems; at least two account systems include a first account system and a second account system; and the first account is an account in the first account system.

In practical applications, the user of the target application system can be divided into an internal user (that is, internal personnel) and an external user (that is, external personnel), and the external user can be a person with limited access to the system. In practical applications, such as ToB, it is common to work with an external team to promote the development of an application system, and the external cooperation team often needs to obtain the internal data of the application system to complete the business requirements during the business processing. However, some internal data in the application system is very sensitive data, such as address book data. In order to ensure data security and at the same time provide an external development team with the capability of acquiring the application system data, this application provides a technical solution that an external development team can safely obtain address book data of a target application system.

The first object may be an external user of the target application system, or referred to as a third-party user; the external user may be a person with limited system usage right; and the third party may refer to an external cooperative team other than the internal development team of the target application system, namely, a development team which can only make secondary development through the interface exposed by the target application system. The first account may be viewed as object identification information for the first object.

The first account system may be an account system used by external personnel, and the second account system may be an account system used by internal personnel of the target application system. The data presented by the target application system may be different under different account systems.

In an embodiment, a two-dimensional code image for logging in a target application system can be acquired, and a first object can send an application login request containing a first account to a server (which can be an application system background) through scanning the two-dimensional code image, so that the server authorizes the first account to log in the target application system based on the application login request.

202: The server generates, according to a first account, a login credential of the terminal corresponding to the first object for logging in the target application system.

In some embodiments, according to the first account, the server may generate a login credential of the terminal corresponding to the first object for logging in the target application system in the following manner:

encrypting the first account to obtain encrypted data; and determining, based on the encrypted data, a login credential of the terminal corresponding to the first object for logging in the target application system.

The manner of encryption processing may be various, for example, the encryption processing may be symmetric encryption or asymmetric encryption, and the embodiment is not limited thereto.

Encrypting the first account may include performing a hash operation on the first account to obtain a hash value of the first account; encryption processing is performed on the hash value of the first account based on the key to obtain encrypted data; and the encrypted data is determined as a login credential of the terminal corresponding to the first object for logging in the target application system.

In practical applications, after receiving an application login request sent by a terminal corresponding to a first object, an application system background can parse the application login request to obtain a first account contained therein, then generate a login credential according to the first account, and dispatch the login credential to the terminal where the first object is located.

203: The server triggers the terminal corresponding to the first object to log in the target application system based on the login credential.

In the embodiment, after a login credential is generated, the login credential may be sent to a terminal corresponding to a first object; and after the terminal corresponding to the first object receives the login credential, the terminal corresponding to the first object may log in a target application system according to the login credential.

204: The server performs, in response to receiving a call request of the terminal for a target component in the target application system, data filtering on component data corresponding to the target component according to the login credential to obtain target component data.

After the terminal corresponding to the first object logs in the target application system, the terminal corresponding to the first object may expose an application page corresponding to the target application system, and the application page may include at least one component; the component may be a software component in a network application, also referred to as a middleware. The component may provide some standard and simple application interface, allowing parameters and attributes to be set and adjusted.

The components in the embodiment may be iframe controls embedded in an application page. Iframe is an HTML tag that can be used to create an inline framework containing another document, that is, to create a document in the document. When the first object accesses the application page embedded with the iframe control, if the iframe control is triggered, the service permission of the first account can be authenticated through the application system background to obtain data that can be accessed by the first object under the account permission of the first account, and then these data are transmitted to the terminal corresponding to the first object.

In the embodiment, based on the provided iframe control, a third party (namely, a first object) cannot directly call the component data. Through the displayed iframe control in the target application system, the iframe control can provide relevant functional interaction; the iframe control is a black box for the third party, and can isolate the component data from the third party, to better ensure the security of data and prevent data leakage.

In some embodiments, the call request includes a login credential. When a server receives a call request of a first object for a target component in a target application system, according to a login credential, data filtering can be performed on component data corresponding to the target component in the following manner:

parsing, in response to receiving the call request of the terminal corresponding to the first object for the target component in the target application system, the login credential in the call request to obtain the first account of the first object; and performing, according to account permission corresponding to the first account, data filtering on the component data corresponding to the target component to obtain the target component data.

The data content of the target application system which cannot be viewed by the first object corresponding to the first account can be determined according to the account permission of the first account; and then the data filtering is performed on the component data corresponding to the target component based on the data content to obtain the target component data. Data filtering is also referred to as data screening. The filtered component data obtained by data filtering is the data content that can be accessed by the first object under the account permission of the first account.

In some embodiments, when receiving a call request of a first object for a target component in a target application system, according to a login credential, data filtering can be performed on component data corresponding to the target component in the following manner:

performing validity verification on the login credential in response to receiving the call request of the first object for the target component in the target application system; and performing, when the login credential passes the validity verification, data filtering on the component data corresponding to the target component to obtain the target component data.

In practical applications, a login credential distributed by an application system background to a terminal corresponding to a first object may have a certain validity time, and the validity time thereof may be set according to actual situations, for example, may be set as 24 hours.

205: The server sends the target component data to the terminal corresponding to the first object to trigger the terminal corresponding to the first object to perform business processing based on the target component data.

In some embodiments, the above at least two account systems further include a second account system; the second account system is an account system where a target organization architecture in a target application system is located; and the target organization architecture includes at least one organization member. The components of the target application system include components corresponding to the organization architecture data.

The target organization architecture may be an organization architecture in the target application system, for example, a department in an enterprise may be regarded as an organization architecture, or the whole enterprise may also be regarded as an organization architecture, and the embodiment is not strictly limited thereto.

It should be noted that component data may include organization architecture data, that is, address book data. The organization architecture data may include the organization architecture itself, as well as the corresponding organization members. The address book refers to the tree structure of enterprise organization architecture and personnel structure in the target application system.

In some embodiments, the target component data (that is, filtered component data) includes target organization architecture data. The server may also perform the following processing:

acquiring original organization identification information about the target organization architecture data under the second account system;

transforming the original organization identification information to obtain target organization identification information about the target organization architecture data under the first account system; and sending target organization identification information to a terminal corresponding to the first object.

The embodiment can convert the original organization identification information about the target organization architecture data in the second account system into the target organization identification information in the first account system to send same to the terminal corresponding to the first object, enabling the terminal corresponding to the first object to display the transformed target organization identification information about the target organization architecture data without displaying the original organization identification information thereof; and hiding the original organization identification information is beneficial to improving the security of the organization architecture data. The target organization identification information aims at a first account system to which a first account of a first object belongs; and the original organization identification information is organization identification information under a native account system inside a target application system.

In some embodiments, the transforming the original organization identification information to obtain target organization identification information about the target organization architecture data under the first account system may include:

encoding, based on the first account of the first object, the original organization identification information to obtain encoded organization identification information; and determining the target organization identification information about the target organization architecture data under the first account system based on the encoded organization identification information.

In practical applications, the embodiment can also encode the first account of the first object into the original organization identification information, so that the obtained target organization identification information is for the first object, and the first account system can also be considered as an account system corresponding to the first object. Based on the object identification information about the joined first object, different third-party development teams (namely, external teams) can be enabled to apply different account systems.

Applying the embodiments of this application, the target application system includes at least two account systems, and as such, accounts in different account systems can be prevented from being mixed, to ensure the security of business data in each account system. For a first account in a first account system in a target application system, a login credential corresponding to the account and used for logging in the target application system is independently generated; and when a call request of a first object for a target component in the target application system is received, data filtering is performed on component data corresponding to the target component according to the login credential. Therefore, the limitation of a data access range of the first object is realized through data filtering, and the function of performing business processing on the premise of ensuring data security in the target application system is realized, and the risk of data leakage is reduced.

Figure 3:
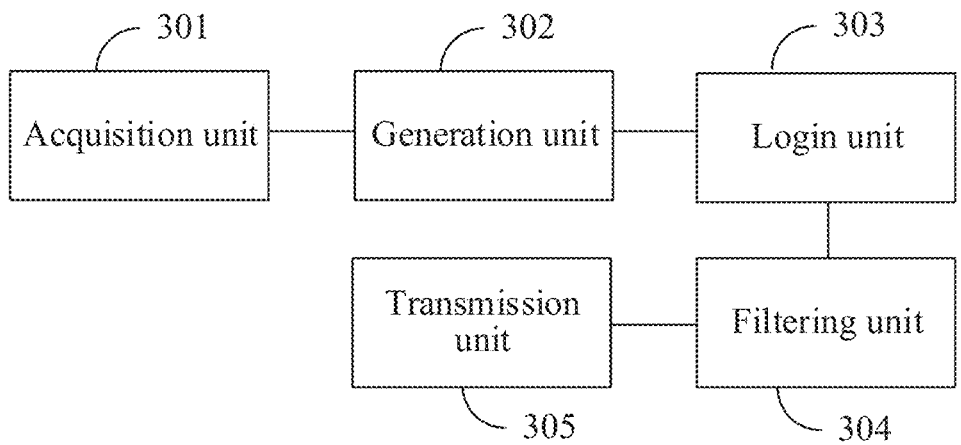
FIG. 3 is a structural diagram of a business data processing apparatus provided by an embodiment of this application.

In order to better implement the above method, the embodiments of this application also provide a business data processing apparatus, and as shown in FIG. 3, the business data processing apparatus may include an acquisition unit 301, a generation unit 302, a login unit 303, a filtering unit 304, and a transmission unit 305, as follows:

(1) Acquisition Unit 301

The acquisition unit is configured to acquire an application login request of a first object for a target application system, the application login request including a first account of the first object, the target application system including at least two account systems, and the first account being an account in a first account system.

(2) Generation Unit 302

The generation unit is configured to generate, according to the first account, a login credential of a terminal corresponding to the first object, the login credential being used for the terminal to log in the target application system.

In some embodiments, the generation unit may include an encryption subunit and a determination subunit, as follows:

The encryption subunit is configured to encrypt the first account to obtain encrypted data.

The determination subunit is configured to determine, based on the encrypted data, a login credential of the terminal corresponding to the first object for logging in the target application system.

(3) Login Unit 303

The login unit is configured to trigger the terminal corresponding to the first object to log in the target application system based on the login credential.

(4) Filtering Unit 304

The filtering unit is configured to perform, in response to receiving a call request of the first object for a target component in the target application system, data filtering on component data corresponding to the target component according to the login credential to obtain target component data.

In some embodiments, the filtering unit may include a verification subunit and a first filtering subunit, as follows:

The verification subunit is configured to perform validity verification on the login credential in response to receiving the call request of the first object for the target component in the target application system.

The first filtering subunit is configured to perform, when the login credential passes the validity verification, data filtering on the component data corresponding to the target component to obtain the target component data.

In some embodiments, the call request includes the login credential.

The filtering unit may include a parsing subunit and a second filtering subunit, as follows:

The parsing subunit is configured to parse, in response to receiving the call request of the terminal corresponding to the first object for the target component in the target application system, the login credential in the call request to obtain the first account of the first object.

The second filtering subunit is configured to perform, according to account permission corresponding to the first account, data filtering on the component data corresponding to the target component to obtain the target component data.

In some embodiments, the call request includes a search request, and the filtering unit may include a search subunit and a third filtering subunit, as follows:

The search subunit is configured to perform, in response to receiving the search request of the first object for the target component in the target application system, data search on the target component to obtain searched component data.

The third filtering subunit is configured to perform data filtering on the searched component data according to the login credential.

(5) Transmission Unit 305

The transmission unit is configured to send target component data to the terminal corresponding to the first object to trigger the terminal corresponding to the first object to perform business processing based on the target component data.

In some embodiments, the second account system is an account system where a target organization architecture in the target application system is located, and the target organization architecture includes at least one organization member. The components of the target application system include components corresponding to the organization architecture data.

In some embodiments, the filtered component data includes filtered target organization architecture data.

The transmission unit may include an acquisition subunit, a transformation subunit, and a transmission subunit, as follows;

The acquisition subunit is configured to acquire original organization identification information about the target organization architecture data in the target application system.

The transformation subunit is configured to transform the original organization identification information to obtain target organization identification information about the target organization architecture data under the first account system.

The transmission subunit is configured to send the target organization identification information to a terminal corresponding to the first object.

In some embodiments, the transformation subunit may also be configured to encode, based on the first account of the first object, the original organization identification information to obtain encoded organization identification information; and determine the target organization identification information about the target organization architecture data under the first account system based on the encoded organization identification information.

In some embodiments, the transmission unit may also include a display subunit, as follows:

The display subunit is configured to trigger a terminal corresponding to the first object to display an address book page corresponding to the target organization architecture data, the address book page including the target organization identification information about the target organization architecture data under the first account system.

It can be seen from the above that in the embodiment, an application login request of a first object for a target application system can be acquired by an acquisition unit 301, the application login request including a first account of the first object, the target application system including at least two account systems, and the first account being an account in a first account system. The generation unit 302 generates, according to the first account, a login credential of a terminal corresponding to the first object for logging in the target application system. The login unit 303 triggers the terminal corresponding to the first object to log in the target application system based on the login credential. The filtering unit 304 performs, in response to receiving a call request of the first object for a target component in the target application system, data filtering on component data corresponding to the target component according to the login credential to obtain target component data. The transmission unit 305 sends target component data to the terminal corresponding to the first object to trigger the terminal corresponding to the first object to perform business processing based on the target component data. This application can generate a login credential corresponding to a first object based on a first account, and limit the data access range of the first object based on the login credential, to realize the function of business processing on the premise of ensuring data security in a target application system, and reduce the risk of data leakage.

Figure 4:
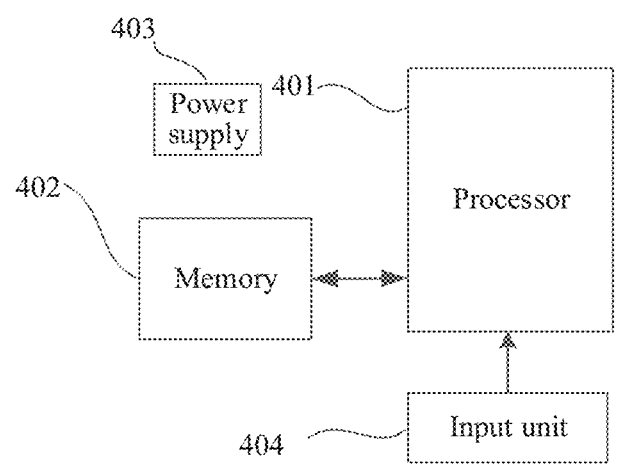
FIG. 4 is a structural diagram of an electronic device provided by an embodiment of this application.

The embodiments of this application also provide an electronic device, as shown in FIG. 4, which shows a structural diagram of the electronic device related to the embodiment of this application; and the electronic device may be a terminal or a server, and the like.

The electronic device may include components such as a processor 401 of one or more processing cores, a memory 402 of one or more computer-readable storage media, a power supply 403, and an input unit 404. The skilled in the art may understand that the electronic device structure shown in FIG. 4 does not constitute a limit to the electronic device. There may include more or fewer parts than those shown in the drawing, may combine some parts, or may have different part arrangements.

The processor 401 is a control center of the electronic device, which is connected to various parts of the entire electronic device using various interfaces and lines. By running or executing a software program and/or module stored in the memory 402 and calling data stored in the memory 402, various functions and processing data of the electronic device are implemented. In some embodiments, the processor 401 may include one or more processing cores. The processor 401 may integrate an application processor and a modem. The application processor mainly processes an operating system, a user interface, an application program, and the like. The modem mainly processes wireless communications. It will be appreciated that the modem processor described above may not be integrated into the processor 401.

The memory 402 may be configured to store software programs and modules. The processor 401 runs the software programs and modules stored in the memory 402 to execute various functional applications and data processing. The memory 402 may mainly include a storage program area and a storage data area; the storage program area may store an operating system, an application program required by at least one function (such as a sound playback function and an image playback function), and the like; the storage data area may store data or the like created according to the use of the electronic device. In addition, the memory 402 may include a high-speed random-access memory, and may also include a non-volatile memory, such as at least one magnetic disk storage device, a flash device, or other volatile solid-state storage device. Accordingly, the memory 402 may also include a memory controller to provide access to the memory 402 by the processor 401.

The electronic device further includes a power supply 403 for supplying power to the various components. For example, the power supply 403 may be logically connected to the processor 401 via a power management system, to manage charging, discharging, and power consumption via the power management system. The power supply 403 may also include any one or more of a direct or alternating current power source, a recharging system, a power failure detection circuit, a power converter or inverter, a power status indicator, and the like.

The electronic device may further include an input unit 404; the input unit 404 may be configured to receive input numeric or character information and to generate keyboard, mouse, joystick, optical or trackball signal inputs related to user settings and function control.

Although not shown, the electronic device may further include a display unit and the like, which will not be described in detail herein. In the embodiment, the processor 401 in an electronic device loads executable files corresponding to processes of one or more application programs into a memory 402 according to the following instructions, and the processor 401 runs the application programs stored in the memory 402, thereby implementing a business data processing method provided by an embodiment of this application.

In this application, the term "module" or "unit" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each module or unit can be implemented using one or more processors (or processors and memory). Likewise, a processor (or processors and memory) can be used to implement one or more modules or units. Moreover, each module or unit can be part of an overall module or unit that includes the functionalities of the module or unit. The ordinarily skilled in the art may understand that all or some steps of the methods in the above embodiments may be implemented using instructions, or implemented through instructions controlling relevant hardware, and the instructions may be stored in a computer-readable storage medium and loaded and executed by a processor.

Accordingly, the embodiments of this application provide a computer-readable storage medium storing therein a plurality of instructions loadable by a processor to perform the steps in any one of the business data processing methods provided by embodiments of this application.

The non-transitory computer-readable storage medium may include a read-only memory (ROM), a random-access memory (RAM), a magnetic disk, an optical disc, or the like.

Since the instructions stored in the computer-readable storage medium can execute the steps in any one of the business data processing methods provided by the embodiments of this application, the advantageous effects which can be achieved by any one of the business data processing methods provided by the embodiments of this application can be achieved, which are described in detail in the preceding embodiments and will not be described in detail herein.

The embodiments of this application further provide a computer program product or computer program including computer instructions, the computer instructions being stored in a computer-readable storage medium. A processor of a computer device reads the computer instructions from a computer-readable storage medium, and the processor executes the computer instructions to cause the computer device to perform the method provided in the various alternative implementations of the above business data processing aspect.

It should be noted that the above description of embodiments is intended only to aid in understanding the methodology and its core concepts of this application. At the same time, for the skilled in the art, according to the idea of this application, there will be changes in the specific implementations and the scope of application. In summary, the content of the specification is not to be construed as limiting this application.

What is claimed is:

1. A business data processing method performed by an electronic device, the method comprising:
   acquiring an application login request of a first object for a target application system, the target application system including a first account system of external users and a second account system of internal users and the application login request comprising a first account of the first object corresponding to an external user associated with the first account system of the target application system;
   generating, according to the first account, a login credential of a terminal corresponding to the first object;
   returning the login credential to the terminal;
   triggering the terminal to log into the target application system based on the login credential;
   in response to receiving a call request of the terminal for a target component of a second account corresponding to an internal user associated with the second account system in the target application system, performing data filtering on component data corresponding to the target component according to the login credential to obtain target component data, further including:
      acquiring original component data associated with the second account under the second account system; and
      transforming the original information to obtain the target component data associated with the first account under the first account system; and
   transmitting the target component data to the terminal, the target component data being used for the terminal to perform business processing with the target application system based on the target component data using the first account under the first account system.

2. The method according to claim 1, wherein the generating, according to the first account, a login credential of a terminal corresponding to the first object comprises:
   encrypting the first account to obtain encrypted data; and
   generating the login credential of the terminal corresponding to the first object based on the encrypted data.

3. The method according to claim 1, wherein the performing data filtering on component data corresponding to the target component according to the login credential to obtain target component data comprises:
   performing validity verification on the login credential in response to receiving the call request of the terminal for the target component in the target application system; and
   performing, when the login credential passes the validity verification, data filtering on the component data corresponding to the target component to obtain the target component data.

4. The method according to claim 1, wherein the call request comprises the login credential; and
   the performing data filtering on component data corresponding to the target component according to the login credential to obtain target component data comprises:
   in response to receiving the call request of the terminal for the target component in the target application system, parsing the login credential in the call request to obtain the first account of the first object; and
   performing, according to account permission corresponding to the first account, data filtering on the component data corresponding to the target component to obtain the target component data.

5. The method according to claim 1, wherein the second account system has at least one organization member; and a component of the target application system comprises a component corresponding to target organization architecture data.

6. The method according to claim 5, wherein the method further comprises:
   acquiring original organization identification information about the target organization architecture data under the second account system;
   transforming the original organization identification information to obtain target organization identification information about the target organization architecture data under the first account system; and
   transmitting the target organization identification information to the terminal.

7. The method according to claim 1, wherein the call request comprises a search request; and the performing data filtering on component data corresponding to the target component according to the login credential to obtain target component data comprises:
   in response to receiving the search request of the terminal for the target component in the target application system, performing data search on the target component to obtain searched component data; and
   performing, according to the login credential, data filtering on the searched component data to obtain the target component data.

8. An electronic device comprising a memory and a processor, the memory storing computer-executable instructions, and the processor being configured to run the computer-executable instructions in the memory to perform a business data processing method including:
   acquiring an application login request of a first object for a target application system, the target application system including a first account system of external users and a second account system of internal users and the application login request comprising a first account of the first object corresponding to an external user associated with the first account system of the target application system;

generating, according to the first account, a login credential of a terminal corresponding to the first object;
returning the login credential to the terminal;
triggering the terminal to log into the target application system based on the login credential;
in response to receiving a call request of the terminal for a target component of a second account corresponding to an internal user associated with the second account system in the target application system, performing data filtering on component data corresponding to the target component according to the login credential to obtain target component data, further including:
  acquiring original component data associated with the second account under the second account system; and
  transforming the original information to obtain the target component data associated with the first account under the first account system; and
transmitting the target component data to the terminal, the target component data being used for the terminal to perform business processing with the target application system based on the target component data using the first account under the first account system.

9. The electronic device according to claim 8, wherein the generating, according to the first account, a login credential of a terminal corresponding to the first object comprises:
  encrypting the first account to obtain encrypted data; and
  generating the login credential of the terminal corresponding to the first object based on the encrypted data.

10. The electronic device according to claim 8, wherein the performing data filtering on component data corresponding to the target component according to the login credential to obtain target component data comprises:
  performing validity verification on the login credential in response to receiving the call request of the terminal for the target component in the target application system; and
  performing, when the login credential passes the validity verification, data filtering on the component data corresponding to the target component to obtain the target component data.

11. The electronic device according to claim 8, wherein the call request comprises the login credential; and
  the performing data filtering on component data corresponding to the target component according to the login credential to obtain target component data comprises:
  in response to receiving the call request of the terminal for the target component in the target application system, parsing the login credential in the call request to obtain the first account of the first object; and
  performing, according to account permission corresponding to the first account, data filtering on the component data corresponding to the target component to obtain the target component data.

12. The electronic device according to claim 8, wherein the second account system has at least one organization member; and a component of the target application system comprises a component corresponding to target organization architecture data.

13. The electronic device according to claim 12, wherein the method further comprises:
  acquiring original organization identification information about the target organization architecture data under the second account system;
  transforming the original organization identification information to obtain target organization identification information about the target organization architecture data under the first account system; and
  transmitting the target organization identification information to the terminal.

14. The electronic device according to claim 8, wherein the call request comprises a search request; and the performing data filtering on component data corresponding to the target component according to the login credential to obtain target component data comprises:
  in response to receiving the search request of the terminal for the target component in the target application system, performing data search on the target component to obtain searched component data; and
  performing, according to the login credential, data filtering on the searched component data to obtain the target component data.

15. A non-transitory computer-readable storage medium storing computer-executable instructions, the computer-executable instructions being loadable by a processor of an electronic device and causing the electronic device to perform a business data processing method including:
  acquiring an application login request of a first object for a target application system, the target application system including a first account system of external users and a second account system of internal users and the application login request comprising a first account of the first object corresponding to an external user associated with the first account system of the target application system;
  generating, according to the first account, a login credential of a terminal corresponding to the first object;
  returning the login credential to the terminal;
  triggering the terminal to log into the target application system based on the login credential;
  in response to receiving a call request of the terminal for a target component of a second account corresponding to an internal user associated with the second account system in the target application system, performing data filtering on component data corresponding to the target component according to the login credential to obtain target component data, further including:
    acquiring original component data associated with the second account under the second account system; and
    transforming the original information to obtain the target component data associated with the first account under the first account system; and
  transmitting the target component data to the terminal, the target component data being used for the terminal to perform business processing with the target application system based on the target component data using the first account under the first account system.

16. The non-transitory computer-readable storage medium according to claim 15, wherein the generating, according to the first account, a login credential of a terminal corresponding to the first object comprises:
  encrypting the first account to obtain encrypted data; and
  generating the login credential of the terminal corresponding to the first object based on the encrypted data.

17. The non-transitory computer-readable storage medium according to claim 15, wherein the performing data filtering on component data corresponding to the target component according to the login credential to obtain target component data comprises:

performing validity verification on the login credential in response to receiving the call request of the terminal for the target component in the target application system; and performing, when the login credential passes the validity verification, data filtering on the component data corresponding to the target component to obtain the target component data.

18. The non-transitory computer-readable storage medium according to claim 15, wherein the call request comprises the login credential; and the performing data filtering on component data corresponding to the target component according to the login credential to obtain target component data comprises:

in response to receiving the call request of the terminal for the target component in the target application system, parsing the login credential in the call request to obtain the first account of the first object; and performing, according to account permission corresponding to the first account, data filtering on the component data corresponding to the target component to obtain the target component data.

19. The non-transitory computer-readable storage medium according to claim 15, wherein the second account system has at least one organization member; and a component of the target application system comprises a component corresponding to target organization architecture data.

20. The non-transitory computer-readable storage medium according to claim 15, wherein the call request comprises a search request; and the performing data filtering on component data corresponding to the target component according to the login credential to obtain target component data comprises:

in response to receiving the search request of the terminal for the target component in the target application system, performing data search on the target component to obtain searched component data; and performing, according to the login credential, data filtering on the searched component data to obtain the target component data.

* * * * *